UNITED STATES PATENT OFFICE.

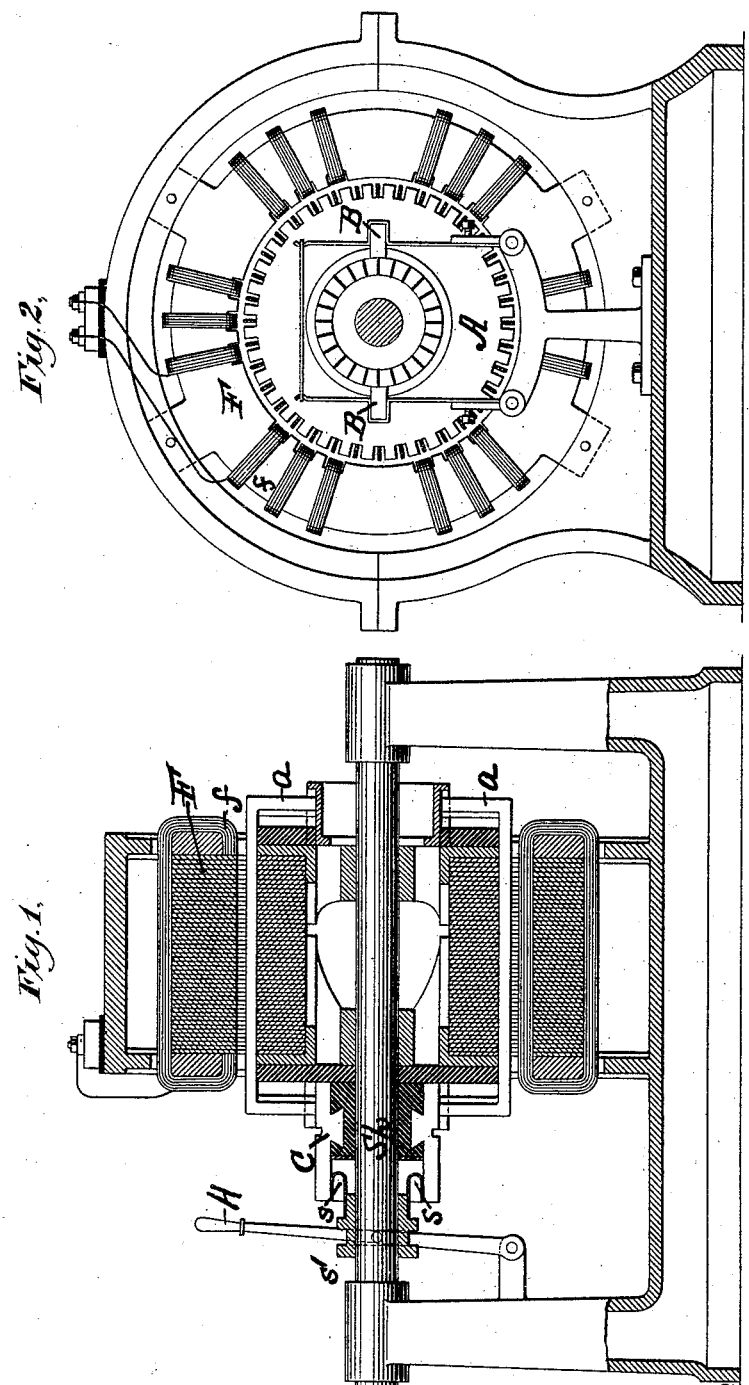

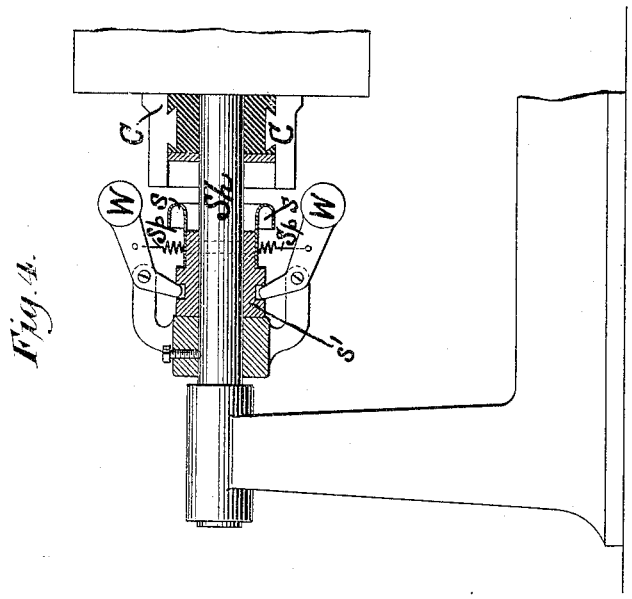
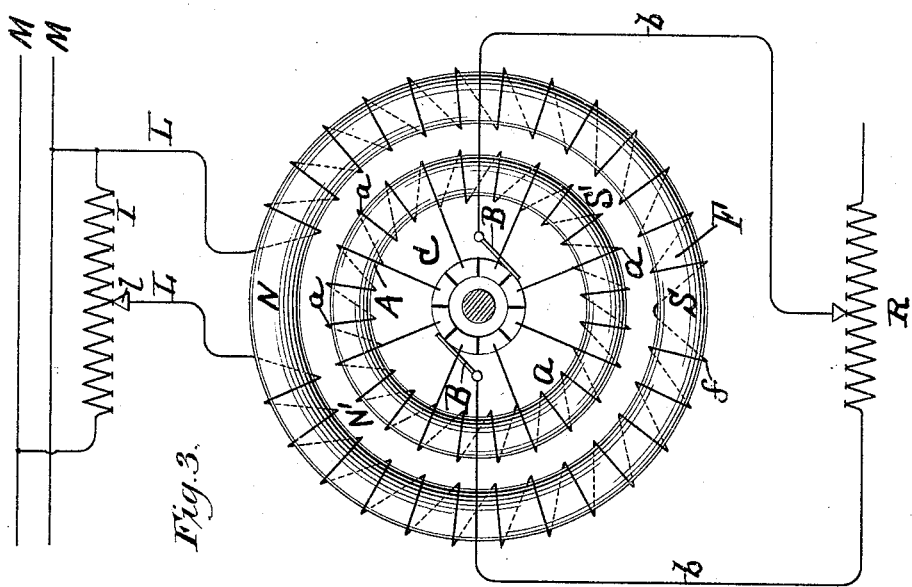

ENGELBERT ARNOLD, OF ZURICH, SWITZERLAND.

ALTERNATING-CURRENT MOTOR.

SPECIFICATION forming part of Letters Patent No. 543,836, dated August 6, 1895.

Application filed October 9, 1894. Serial No. 525,362. (No model.)

*To all whom it may concern:*

Be it known that I, ENGELBERT ARNOLD, of Zurich, Switzerland, have invented new and useful Improvements in Alternating-Current Motors and Methods for Starting and Operating the Same, of which the following is a description, referring to the accompanying drawings, which form a part of this specification.

My invention relates particularly to single-phase motors of the lag or non-synchronous type—that is to say, when running with full load the armature rotates somewhat more slowly than a speed corresponding with synchronism to the phases of the actuating-current, the lag or loss in speed generating the armature-current, which causes the torque and develops the necessary energy. If an alternating current be supplied to the field-magnet of an alternating-current motor and the armature be held stationary, the armature-coils act as the secondary coils of a converter, and if the armature be gram wound the generated electromotive forces reach their maximum and minimum under the several poles. If the armature-windings be connected across from opposite sides in a plane at right angles to the field of force no current whatever will flow through such connection, because the coils on either side of the plane counteract those upon the other side. If, however, the coils are connected diagonally, by means of brushes or other connections, current will flow alternately through the connection, being the greater the nearer the brushes correspond to the maximum and minimum points of the commutator, which lie beneath the pole-pieces. If the brushes are directly in a line with the pole-pieces there is no torque produced, but as the brushes are shifted to one side the poles produced in the armature will be repelled by the poles produced in the field-magnets. This repulsion is caused by the lag of the poles in the armature, which, alternating somewhat more than a quarter phase behind the producing-poles, are of opposite polarity thereto for a period greater than one-half of each reversal, so that, although there is an alternating attraction and repulsion, the repulsion exceeds the attraction and causes torque or rotation. It is, however, sufficient for the purposes of this application that such a repulsion does take place without inquiring into the phenomena or laws which cause it. Upon this principle of operation I have based a new method of starting and controlling alternating-current motors of all sizes, for I find that it works as well with motors of large horse-power as with smaller ones. I supply an alternating current to the field-coils only in my machine, controlling it by suitable inductive or other resistances. I provide the armature with a commutator and brushes in a manner similar to a constant-current motor; but these brushes, instead of being connected to the external current, are connected through a resistance directly with each other. On starting the motor the brushes are placed at an angle upon the commutator between the line of neutral induction and maximum induction. The currents generated produce poles at positions controlled by the positions of the brushes, and the strength of these poles may be varied by altering the positions of the brushes or by introducing more or less resistance into the brush-circuit. By brush-circuit I mean the circuit between the brushes and through the resistance. By this method I can produce considerable torque without any considerable waste of energy, for the currents generated, if controlled and directed by the brushes, produce poles at the proper points to cause rotation. As synchronism is approached, which on light load would be very quickly, I short-circuit all the separate coils of the armature, so that thereafter it runs as a lag-motor having separately short-circuited armature-windings. The brushes may then be raised from the commutator, as they fulfil no further purpose.

Such, briefly, is my method of starting and operating single-phase electric motors. The details of my construction will be more clearly understood from a description of the accompanying drawings, which include a method of automatically short-circuiting the armature-coils when synchronous speed is approached.

Figure 1 is an axial or longitudinal cross-section of one of my motors, the brushes and brush-holders being, however, omitted for clearness. Fig. 2 is an end view showing the shaft cut off and the short-circuiting device omitted, but showing in full the brushes and their holders. Fig. 3 is a diagrammatic illustration of the circuits and connections of my motor; and Fig. 4 is a detail view, partly in section, of my automatic short-circuiter.

Throughout the figures like letters of reference indicate like parts.

In Figs. 1 and 2 I have shown the general organization of the machine, with a ring armature-core and ring field-magnets suitably laminated and mounted. These details do not, however, peculiarly concern the invention, and therefore I will omit all description further than to say that the field-magnet is lettered F and its winding $f$; that the armature-core is lettered A and its winding $a$.

In Fig. 1 the conductors are bars and the winding is of the drum type. The commutator is shown at C.

The diagrammatic illustration of my invention (shown in Fig. 3) will more clearly show the connections and manner of operating, the armature in the figure being Gramme type. The external circuit or mains are shown at M. The leads or connections to the terminals of the field-magnet coils $f$ are shown at L, an inductive resistance I being employed with a sliding contact $l$ in order to control at will the current which is supplied to the motor.

The brushes B are placed upon the armature, as shown, diagonally to the poles of the field-magnets. For clearness I have indicated the poles by the letters N and S, though as the poles alternate these letters do not, of course, indicate any permanent polarity. The position of the armature-poles is indicated by N' and S', but this also must be considered as instantaneous values, since the polarity, of course, alternates with the alternations of the induced current. The brushes B are connected together through the conductors $b$ and adjustable resistance R. Through this resistance R they may be more or less short-circuited and the armature-currents thereby controlled. Shifting of the brushes may be employed to control the current, but it is often better to place the brushes at the angle producing the greatest torque and control the amount of the torque by diminishing the currents induced.

Within the commutator C in the diagram Fig. 3 I show a series of contacts $s$, which are intended to short-circuit the individual coils of the armature by directly connecting the adjacent commutator bars or segments when synchronous speed has been attained or approached. The details of these short-circuiting contacts $s$ are clearly seen in Fig. 1, where the commutator is shown short-circuited by them.

$s'$ is a rotary sliding sleeve turning with, but sliding upon, the shaft S$h$. A hand-lever H is employed to slide the sleeve $s'$ along the shaft as desired. The lever may be connected to the sleeve by a collar or in any other suitable manner, the choice of details being no part of the invention. The contacts $s$ are preferably U-shaped and mounted upon the sliding sleeve. This U shape gives a firm spring-pressure when the contacts are forced into place under the projecting ends of the commutator-bars, as shown in the figure. In this form of short-circuiter it is necessary for the motorman to throw the handle when synchronism is reached or sufficiently approached and in this manner short-circuit the commutator-plates and the several coils of the armature, after which he should raise the brushes of the commutator to save useless wear.

In Fig. 4, however, I show an automatic means for throwing the sleeve and short-circuiting the commutator. The weighted levers W, restrained by the spring S$p$, hold the sleeve $s'$ withdrawn from the commutator when the motor is stationary, spring S$p$ operating to draw the weights together. When, however, a predetermined speed is acquired, the centrifugal force overcoming the tension of the spring throws out the weights, and the centrifugal force, increasing as the weights are thrown farther from the shaft, which is the axis of motion, drives the sleeve with the short-circuiting contact $s$ firmly under the plates of the commutator and short-circuits the armature. It is clear that the details of this automatic short-circuiting device may be somewhat modified without departing from the principles involved; but I make no broad claim to the use of centrifugal force causing short-circuiting, the novel features being in the employment of any automatic device in combination with the other parts of my invention to carry out my method.

In other respects, also, I have purposely omitted the description of details and the enumeration of many modifications which may be made without departing from the principles of my invention, because to set these forth at length would obscure rather than make clear the more essential features.

Having, however, fully set forth one form of my method and the construction of one type of the machine for putting it into operation, I claim, and desire to secure by these Letters Patent, together with all such modifications as may be made by mere skill and with only the limitations expressed or by law implied in view of the state of the related arts, the following:

1. The method of operating a single-phase alternating current motor—by supplying an alternating current to the field coils and directing and controlling the flow of induced currents in the armature at starting thereby producing poles and giving initial rotation to the armature, and thereafter short-circuiting the individual coils of the armature, substantially as set forth.

2. The method of operating a single-phase alternating current motor—by supplying an alternating current to the field coils and directing and controlling the flow of induced current in the armature at starting thereby producing poles and giving initial rotation to the armature, and thereafter automatically short-circuiting the individual coils of the armature, substantially as set forth.

3. In an alternating current electric motor, field coils having terminal connections for the external circuit, armature coils, a commutator therefor, commutator brushes, circuit $b$, and means for directly short-circuiting the armature coils, substantially as set forth.

4. In an alternating current electric motor, field coils having terminal connections for the external circuit, armature coils, a commutator therefor, commutator brushes, circuit $b$, and a device controlled by the speed of the motor for automatically directly short-circuiting the armature coils, substantially as set forth.

5. In an alternating current electric motor, field coils having terminal connections for the external circuit, armature coils, a commutator therefor, commutator brushes, circuit $b$, the said armature coils being connected with the segments of the said commutator and having no connection whatever with the external circuit, and means for individually short-circuiting the said armature coils, substantially as set forth.

In testimony whereof I have hereunto set my hand, at Zurich, Switzerland, this 4th day of September, A. D. 1894.

ENGELBERT ARNOLD.

Witnesses:
 H. LABHART,
 ROSA MINDER.